Dec. 11, 1951 A. E. SCHUBERT 2,578,320
PHOTOGRAPHIC APPARATUS FOR SUCCESSIVELY
COPYING EACH SIDE OF A DOCUMENT
Filed Dec. 28, 1950 4 Sheets-Sheet 1

ALVIN E. SCHUBERT
Inventor

Dec. 11, 1951   A. E. SCHUBERT   2,578,320
PHOTOGRAPHIC APPARATUS FOR SUCCESSIVELY
COPYING EACH SIDE OF A DOCUMENT
Filed Dec. 28, 1950   4 Sheets-Sheet 3

ALVIN E. SCHUBERT
Inventor

By Daniel J. Mayne

Lloyd F. Aubach
Attorney & Agent

Patented Dec. 11, 1951

2,578,320

UNITED STATES PATENT OFFICE 2,578,320

PHOTOGRAPHIC APPARATUS FOR SUCCESSIVELY COPYING EACH SIDE OF A DOCUMENT

Alvin E. Schubert, Rochester, N. Y., assignor to Eastman Kodak Company, Rochester, N. Y., a corporation of New Jersey Application December 28, 1950, Serial No. 203,183

16 Claims. (Cl. 88—24)

This invention relates to photographic copying apparatus and more particularly to apparatus in which the obverse and reverse sides of a document are photographed successively, and in which the images of the document are arranged on the light-sensitive material in spaced-apart relation lengthwise thereof.

Heretofore, the photographing of both sides of a document has been accomplished by feeding the document through the photographic field twice with either manual or automatic reversal of the document before the second feeding, or by feeding the document through the photographic field once and scanning both sides of the document simultaneously. In the first instance, the images are arranged lengthwise of the light-sensitive material and, as a result, the reduction of the image is determined by the width of the light-sensitive material. This arrangement, however, possesses a disadvantage in that the document must be fed through the photographic field twice, thereby greatly reducing the number of documents capable of being handled by the apparatus in any given period of time. While in the second arrangement the document is fed through the photographic field only once, the images must be greatly reduced so that the images of the obverse and reverse sides of the documents can be arranged in side-by-side relationship on the light-sensitive material. Such an arrangement, however, possesses the disadvantage in that because of the large reduction of the image, the legibility of portions of the document is seriously impaired.

The present invention combines the advantages of both arrangements without the disadvantages so that a minimum reduction of the document is obtained by feeding the document through the photographic field only once and thereby maintaining a high rate of document feed. This is accomplished by providing photographic fields or apertures in the document guideway which are spaced apart by a distance greater than the length of the document and on opposite sides of the guideway for successively viewing transverse areas of the obverse and reverse sides of the document. Projection lens systems are provided for receiving and projecting the scanned image of each side of the document onto the light-sensitive material, the lens systems having their optical axes substantially parallel and being displaced horizontally and vertically from the optical center line of the camera. As a document is fed past the first aperture, the image of the obverse side of the document is directed into its proper lens system by a mirror angularly disposed with respect to the aperture until the entire document has been imaged on the light-sensitive material. The document then enters the second aperture, and the image of the reverse side of the document is then directed into its respective lens system by a second mirror angularly disposed with respect to the aperture until the entire document has been scanned. Inasmuch as the light-sensitive material is advanced in synchronism with the document moving through the guideway and past the apertures, the image of the reverse side of the document follows the obverse image so that the obverse and reverse images of the document are successively exposed on the light-sensitive material.

The primary object of the invention, therefore, is to provide a photographic copying apparatus in which the obverse and reverse sides of a document are successively photographed and the images thereof are spaced lengthwise of the light-sensitive material.

Another object of the invention is to provide a photographic copying apparatus in which the photographic fields for the obverse and reverse sides of a document are spaced apart by a distance greater than the length of the document.

Still another object of the invention is to provide a photographic copying apparatus in which a separate projection lens system is provided for each side of the document, the lens systems being displaced horizontally and vertically from the optical axis of the camera.

Yet, another object of the invention is to provide a photographic copying apparatus in which a photographic field is provided for the obverse side of the document and a plurality of photographic fields are provided for the reverse side of the document, said plurality of photographic fields being spaced from said first-mentioned photographic field by varied distances so the proper aperture may be chosen in accordance with the size of the document to be photographed.

And still another object of the invention is to provide a photographic copying apparatus in which a mask is arranged adjacent the light-sensitive material and a separate projection lens system is provided for each side of the document, the lens systems being displaced horizontally and vertically from the optical axis of the camera for varying the predetermined spacing between successive document images on the light-sensitive material.

Other objects and advantages will be apparent to those skilled in the art by the description which follows.

The objects of the invention are embodied in a photographic copying apparatus for successively photographing both sides of a document and having an exposure station through which a light-sensitive material is moved, a guideway for the document and provided with an aperture for successively viewing transverse areas of the obverse side of the document and with a second aperture for successively viewing transverse areas of the reverse side of the document, said apertures being spaced apart in the direction of document movement by a distance greater than the length of the document, advancing means for moving the document through the guideway and for moving the light-sensitive material through the exposure station in synchronism with the movement of the document, projection lens system including a lens system for receiving the image of the obverse side of the document and a second lens system for receiving the image of the reverse side of the document, said lens systems having their optical axes substantially parallel and displaced in horizontal and vertical planes for projecting said images successively onto said light-sensitive material in spaced relation lengthwise thereof, and reflecting means angularly disposed with respect to each of said apertures for directing said images into its respective lens system.

Reference is now made to the accompanying drawings wherein like reference numerals designate like parts, and wherein.

Figure 1:
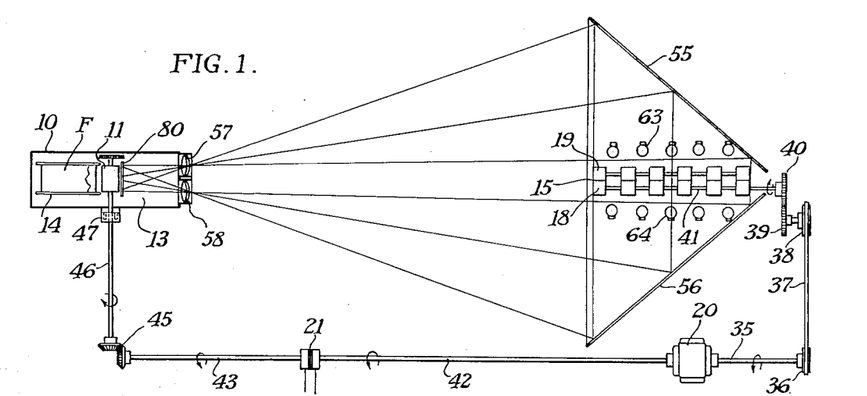
Fig. 1 is a diagrammatic plan view of a photographic copying apparatus embodying my invention.

According to the invention, the apparatus, as shown in Fig. 1, comprises a film unit 10 in which a strip of light-sensitive material or film F is moved by a film drive roller 11 from a supply reel 14, through exposure station 13 and to a take-up reel, not shown, in a well-known manner. The document to be photographed is inserted into a feeding station 15 and moved vertically downward through a guideway 16 and past a plurality of photographic stations 17. The document is moved downward through the guideway by a plurality of spaced contacting rollers comprising drive rollers 18 and driven rollers 19. A motor 20 drives the rollers 18 and through a magnetic clutch 21 drives the film drive roller 11 so that the film strip is moved vertically upward through the exposure station in synchronism with the document as it is moved vertically downward past the photographic stations.

The guideway 16 comprises two spaced plates 25 and 26 extending vertically downward from the feeding station 15 and provided, respectively, with suitable apertures 27 and 28 for drive rollers 18 and driven rollers 19. Plate 25 is provided with an aperture 29 located below the feeding station and in which a glass flat 30 is mounted for viewing transverse areas of the obverse side of the document. Plate 26 is provided with apertures 31 and 32 spaced from aperture 29 in the direction of document movement and in which glass flats 33 and 34 are mounted, respectively, for viewing transverse areas of the reverse side of the document. While guideway 16 is continuous throughout its length, it provides, in effect, a guideway for the document as the obverse side is viewed and a second guideway for the document as the reverse side is viewed.

Figures 4, 8:
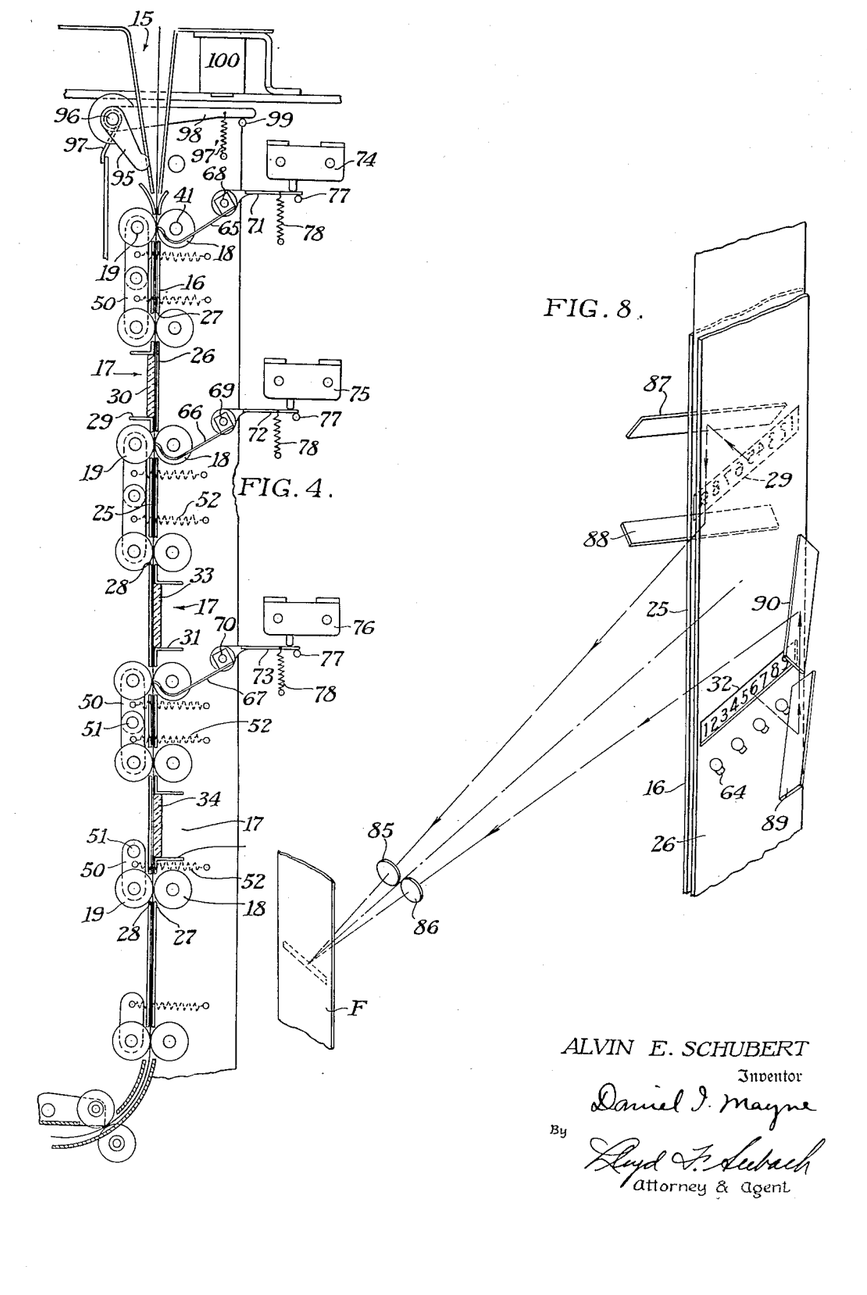
Fig. 4 is a vertical section through the guideway and showing the location of the photographing stations and the document drive rolls.
Fig. 8 is a diagrammatic perspective view of another embodiment of the invention and showing the projection lens systems displaced only in a horizontal plane and the reflecting systems for directing the images into the plane of the lens systems.
Figure 5:
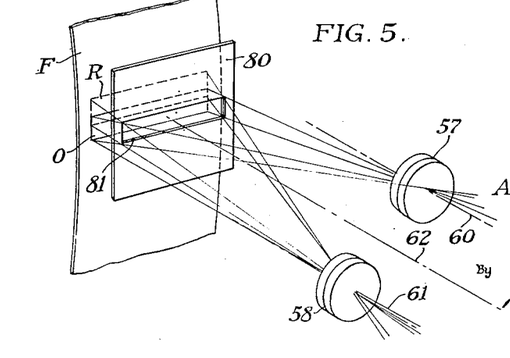
Fig. 5 is a diagrammatic perspective view of the offset projection lens systems and the mask adjacent the light-sensitive material and showing how the parallax effect varies the predetermined spacing between successive document images.

The advancing means comprises motor 20 which through shaft 35 rotates pulley 36 connected by belt 37 to pulley 38 for driving gears 39 and 40, the gear 40 being on shaft 41 to which the uppermost set of drive rollers 18 is secured. The motor 20 is also provided with a shaft 42 which is connected to shaft 43 through the medium of electromagnetic clutch 21. A pair of bevel gears 45 transmits the rotation of shaft 43 to shaft 46 which is clutched at 47 to the film drive roller 11 when the film unit is positioned in the apparatus in a well-known manner. The drive rollers 18 are spaced transversely and vertically of the guideway 16, as shown in Figs. 1, 4 and 5, and their respective shafts 41 are rotated by a plurality of endless chains 48 connecting sprockets 49 on the shaft of each set of drive rollers 11. Driven rollers 19 are mounted on one end of the links 50 which are pivotally mounted on shafts 51 and biased toward their respective drive rollers by springs 52. The motor 20, therefore, serves, through the rollers 18 and 19, to continuously move the document vertically downward through guideway 16 and to move the film strip vertically upward in synchronism with the movement of the document when clutch 21 is energized.

Figure 2:
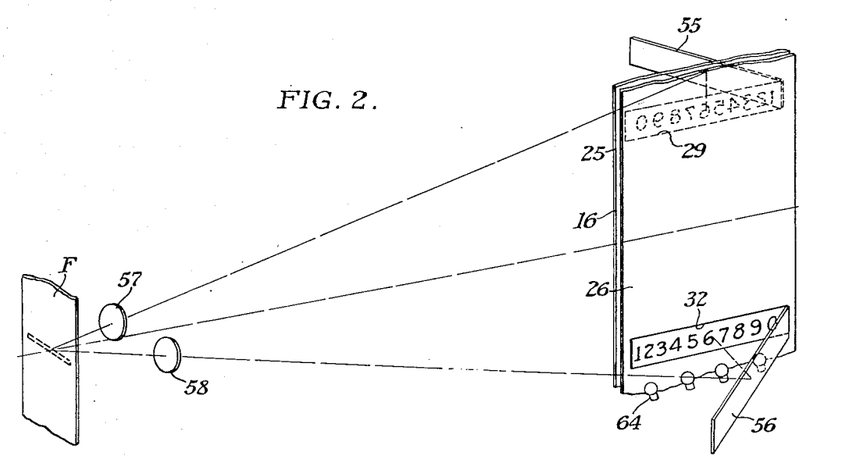
Fig. 2 is a diagrammatic perspective view of the preferred embodiment of the invention and showing the relation of the spaced apertures, reflecting means and displaced projection lens system.
Figures 3, 6, 7:
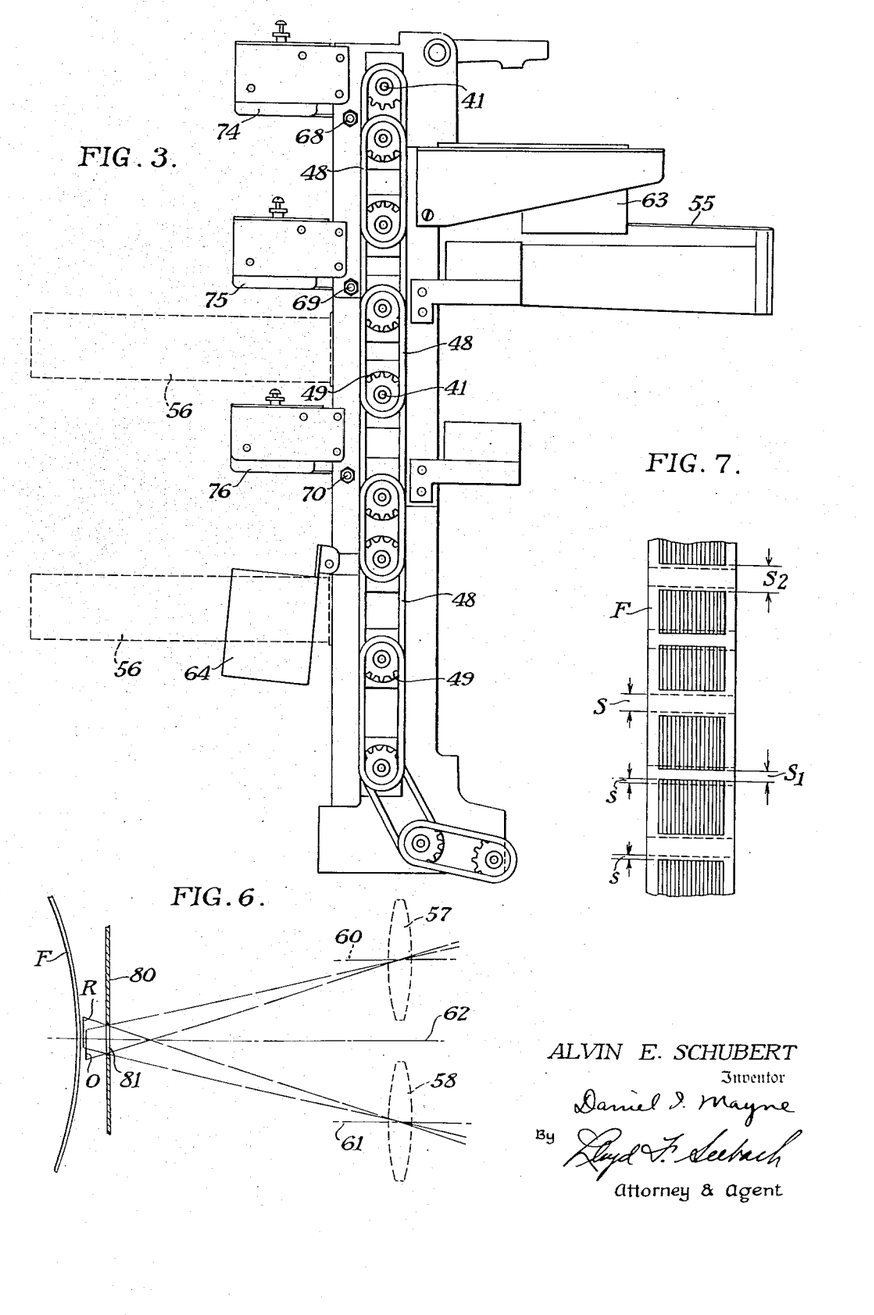
Fig. 3 is a side elevation of the document guideway and showing the drive mechanism for moving the document through the guideway and the arrangement of the reflecting means.
Fig. 6 is a side elevation of the parts disclosed in Fig. 5 and showing the additive and subtractive effects of the mask and offset lens system.
Fig. 7 is a detail view of a strip of light-sensitive material and showing the predetermined spacing between successive document images and the additive and subtractive amounts which vary the predetermined spacing.

As shown in Fig. 1, the transverse areas of the document that are viewed through apertures 29, 31 and 32 are directed by reflecting means or mirrors 55 and 56, which are angularly disposed with respect to said apertures, to the projection lens systems 57 and 58, respectively, positioned in exposure station 13. Lens systems 57 and 58 have their optical axes 60 and 61 arranged substantially parallel to each other and to the optical axis 62 of the film unit but displaced horizontally and vertically from each other, as shown in Figs. 2 and 6, in accordance with its respective aperture and mirror. Lens system 57 is displaced horizontally and vertically upward whereas lens system 58 is displaced horizontally and vertically downward. The result of this displacement is that the location of the image received from aperture 29 is formed on film strip F in exactly the same location as the image received from aperture 31 or 32 depending on the length of the document being photographed. Apertures 31 and 32 are provided to permit photographing different-length documents. For instance, if documents the size of checks are to be photographed, the mirror 56 is positioned opposite aperture 31, as indicated by the dotted line position in Fig. 3. If documents are greater in length than the distance between apertures 29 and 31, then the mirror 56 is positioned opposite aperture 32. In other words, mirror 56 is positioned opposite either aperture, the aperture used being determined by the length of the document being photographed.

When a document is inserted in feeding station 15, it is picked up by rollers 18 and 19 and moved through guideway 16. As successive transverse areas of the obverse side are viewed through aperture 29, the mirror 55 directs said viewed areas into lens system 57 which, in turn, projects said image onto the light-sensitive material being moved through the exposure station in synchronism therewith. Since the aperture for viewing the obverse side of the document is spaced from the aperture for viewing the reverse side of the document by a distance greater than the length of the document, the reverse side of the document does not begin to enter aperture 31 or aperture 32, depending on the length of the document, until it has been completely viewed by aperture 29. Successive areas of the reverse side of the document are then viewed by apertures 31 and 32 and directed by mirror 56 into lens system 58 which projects the image onto the light-sensitive material immediately following the image of the obverse side of the document, or in other words, the images are in spaced relation lengthwise of the film strip F.

The apertures 29, 31 and 32 are illuminated, respectively, by the lamp banks 63 and 64, lamp bank 64 being arranged between apertures 31 and 32 for illuminating both apertures. The document-operated control members are spaced from apertures 29, 31 and 32 so as not to interfere with the photographic copying process. Such control members take the form of trip fingers 65, 66 and 67 which are arranged above each of the apertures, as shown in Fig. 4; each trip finger being representative of a plurality of such fingers arranged transversely of guideway 16 and secured to shafts 68, 69 and 70, respectively. Shafts 68, 69 and 70 have actuating links 71, 72 and 73 secured thereto and are adapted, upon movement of said trip fingers by the document, to simultaneously actuate switches 74 and 74', 75 and 75', and 76 and 76' which control energization of the lamp banks and the film strip advancement, as described hereinafter. Links 71, 72 and 73 are held against pins 77 by springs 78 so that fingers 65, 66 and 67 are normally maintained in the document path and in the position shown in Fig. 5 as is well-known in the art.

While successive transverse areas of the obverse and reverse sides of the document are viewed by apertures 29 and 31 or 32, a mask 80, provided with an aperture 81, is positioned in exposure station 13 and spaced slightly from the light-sensitive material for defining the actual photographing area. Inasmuch as lens systems 57 and 58 are displaced horizontally and vertically from the optical axis of the film unit, the displacement of these lens systems introduces a vertical displacement of the images on the film strip so that the spacing between successive images is varied. As is well known in the photocopying field, a predetermined spacing S is maintained between successive document images, and one way of providing such a predetermined spacing is disclosed in U. S. Patent No. 2,403,711 issued July 9, 1946, to J. F. Egan, and is described in conjunction with the present invention hereinafter. In the Egan patent, advancement of the film strip commences at the time the leading edge of the document enters the photographing aperture and is stopped when the trailing edge of the document leaves the photographing aperture so that there is always an area of film at the exposure station upon completion of each photographing cycle which is not exposed. This area is equivalent in width to the photographing apertures or, if mask 80 is used, is equivalent to the width of aperture 81. This area, therefore, represents the predetermined spacing S between successive document images and is constant irrespective of document length. With reference to Figs. 5–7, it will be noted that the image O of the obverse side of the document, projected by lens 57 and defined by aperture 81 on film strip F, is displaced in a downward direction from the optical axis 62 of the film unit 10, and that the image R of the reverse side of the document, projected by lens 58 and defined by aperture 81 on film strip F, is displaced in an upward direction from optical axis 62. This displacement results in an increment $s$ of spacing which is added to, or subtracted from, the predetermined spacing S, as shown in Fig. 7, and effects a spacing $S_1$ between the images of the obverse and reverse sides of the same document which is smaller than the predetermined spacing and a spacing $S_2$ between the image of the reverse side of one document and the image of the obverse side of the succeeding document which is larger than the predetermined spacing. This arrangement of the lens systems 57 and 58 and mask 80 groups, or pairs, the images of the same document, so that in projecting the film strip, each document is readily discernible.

In Fig. 8 another embodiment of the invention is disclosed in which the projection lens systems 85 and 86 have their optical axes substantially parallel and in the same plane. The reflecting system on each side of the guideway, however, comprises two sets of mirrors. A mirror 87 is angularly disposed with respect to aperture 29 and directs the successive transverse areas of the obverse side of the document vertically downward to a second mirror 88 whose optical axis is in the plane of the optical axis of lens system 85 and which directs the image received from mirror 87 into lens system 85. The second set of mirrors is arranged in a similar manner on the opposite side of guideway 16 and includes a mirror 89 angularly disposed with respect to aperture 31 or 32 for directing the successive transverse areas of the reverse side of document vertically upward to a second mirror 90 whose optical axis is in the plane of the optical axis of lens system 86 and which directs the image received from mirror 89 into lens system 86. With the exception of the arrangement of the mirror and lens system, this embodiment is exactly the same as that previously described.

To prevent documents being fed into station 15 before both sides of the previously fed document have been photographed, a plurality of fingers 95 are arranged transversely of shaft 96 and are normally biased by spring 97 into an inoperative position as indicated in Fig. 4 wherein said fingers do not interfere with insertion of a document into said feeding station. Arm 98, which is secured to shaft 96, is normally maintained against pin 99 by spring 97'. Upon energization of solenoid 100, arm 98 is moved toward said solenoid, thereby rotating shaft 96 to position fingers 95 in a blocking position with respect to station 15 so as to prevent insertion of another document into said station. The solenoid 100 is energized in timed relation to energization of clutch 21, as described hereinafter.

Figure 9:
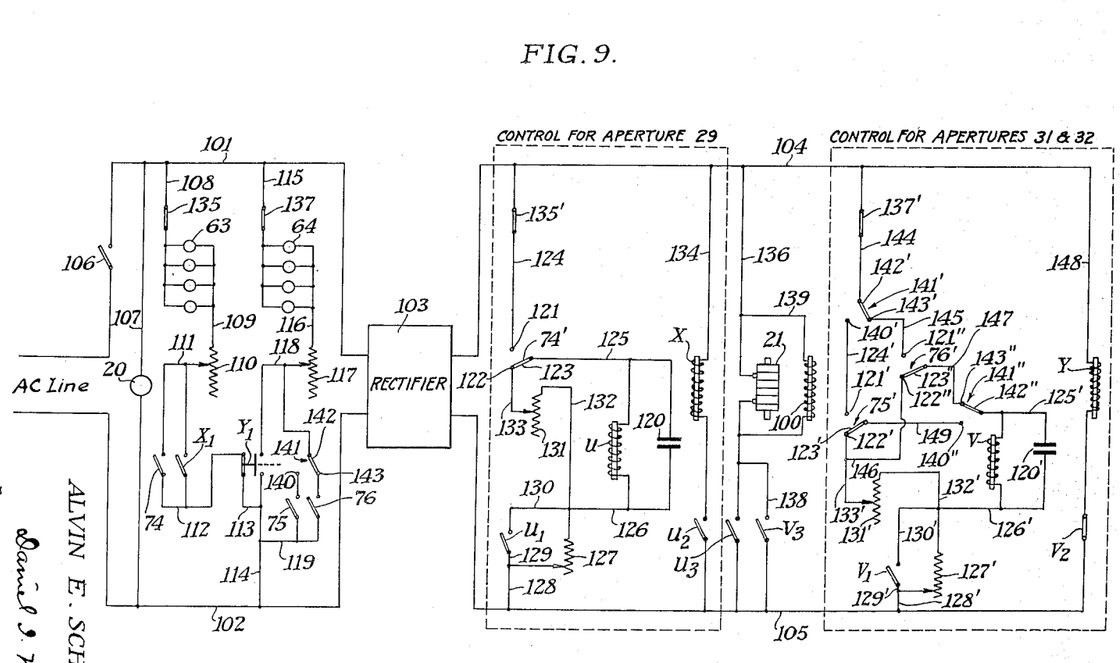
Fig. 9 is a wiring diagram of the circuits embodied in the present invention.

The cycle of operation and cooperation between the various elements will best be understood by a description of the circuit diagram disclosed in Fig. 9. The A. C. lines are connected by lines 101 and 102 to a rectifier 103 which provides D. C. current to the control circuits via lines 104 and 105. A switch 106 is located in line 101 which, when closed, completes the circuit through rectifier 103 and the circuit for motor 20 which is connected across lines 101 and 102 by lead 107. Since motor 20 is connected directly to shaft 41 of the upper drive rollers 18, the rollers 18 and the contacting rollers 19 are continuously driven to move a document through guideway 16. The lamps comprising lamp bank 63 are arranged in parallel with a lead 108 connecting one side of said lamps to line 101 and a lead 109 connecting the other side of said lamps to a variable resistance 110. The upper trip finger switch 74 and relay switch $X_1$ are connected in parallel across leads 111 and 112, lead 111 being connected to resistance 110 and lead 112 being connected to one normally closed contact of relay switch $Y_1$. The other normally closed contact of relay switch $Y_1$ is connected by lead 113 to lead 114 which connects a normally open contact of relay switch $Y_1$ with line 102. The lamps comprising lamp bank 64 are connected in parallel with a lead 115 connecting one side of said lamps to line 101 and a lead 116 connecting the other side of said lamps to a variable resistance 117 which is connected by lead 118 to the other normally open contact of relay switch $Y_1$. The lower trip finger switches 75 and 76 are connected in parallel across lead 118 and lead 119 connected to lead 114, the contact arm 142 of switch 141, which is a single-pole, double-throw gang-type switch, completing the circuit through either contact 140 or 143 depending on the aperture being used.

The control means for the illumination of aperture 29 and for advancement of the film strip comprises a condenser 120. Document-actuated switch 74' has terminals 121 and 122 and an arm 123 which is normally in the position shown. Terminal 121 is connected by lead 124 to line 104 and a lead 125 connects switch arm 123 to one side of condenser 120. The other side of condenser 120 is connected by lead 126 to the variable resistance 127 and the other side of resistance 127 is connected by lead 128 to line 105. A master relay coil U is connected across leads 125 and 126 and in parallel with condenser 120, said relay coil operating switches $U_1$, $U_2$, and $U_3$. A shunt circuit for short-circuiting resistance 127 comprises a lead 129 connecting lead 128 with one side of switch $U_1$ and a lead 130 connecting lead 126 to the other side of switch $U_1$. A second variable resistance 131 has one side connected by lead 132 to lead 126 and the other side connected by lead 133 to terminal 122 of switch 74'.

Relay X and switch $U_2$ are connected in series across lines 104 and 105 by lead 134. Clutch 21 and switch $U_3$ are connected in series across lines 104 and 105 by lead 136 with switch $V_3$ connected in series parallel with switch $U_3$ by the lead 138 and solenoid 100 connected in parallel with clutch 21 by lead 139.

The control means for the illumination of apertures 31 and 32 and for the advancement of the film strip also comprises a condenser 120'. Document-actuated switch 75' has terminals 121' and 122' and an arm 123' and is normally in the position shown. Terminal 121' is connected by lead 124' to terminal 140' of switch 141' whose contact member 142' normally engages terminal 143' and is connected by lead 144 to line 104, and a lead 149 connects switch arm 123' to terminal 140'' of switch 141''. The other side of condenser 120' is connected by lead 126' to the variable resistance 127' and the other side of resistance 127' is connected by lead 128' to line 105. A master relay coil V is connected across leads 125' and 126' and in parallel with condenser 120', said relay coil operating switches $V_1$, $V_2$ and $V_3$. A shunt circuit for short circuiting resistance 127' comprises a lead 129' connecting lead 128' with one side of switch $V_1$ and a lead 130' connecting lead 126' to the other side of switch $V_1$. A second variable resistance 131' has one side connected by lead 132' to lead 126' and the other side connected by lead 133' to terminal 122' of switch 75'. The terminal 143' of switch 141' is connected by lead 145 to terminal 121' of switch 76'. The other terminal 122'' of switch 76' is connected to lead 133' by lead 146 and switch arm 123'' is connected by lead 147 to terminal 143'' of switch 141''. Switch 141, 141' and 141'' are actuated simultaneously being of a gang-type switch and, therefore, provide a means for shifting control of condenser 120' and relay coil V to trip fingers 66 and 67 depending on the aperture chosen. Relay Y and switch $V_2$ are connected in series across lines 104 and 105 by lead 148.

As the document is moved from feeding station 15 toward aperture 29 by rollers 18 and 19, the document strikes fingers 65, thereby rotating shaft 68 and link 71 to actuate switch 74 to a closed position for completing a circuit through leads 114 and 113, switch $Y_1$, lead 112, switch 74, lead 111, resistance 110, lamp bank 63 and lead 108 to provide illumination for aperture 29. At the same time, switch 74' is actuated so that arm 123 is moved into engagement with terminal 121. This places condenser 120 across lines 104 and 105 and charging it at a rate determined by the capacity of the condenser, the value of resistance 127 and/or voltage across the output terminals of the rectifier, the rate being varied by varying the resistance 127. The voltage drop across leads 125 and 126 on account of the charging of condenser 120 will be reduced or maintained below the critical voltage necessary to energize relay coil U, however, as condenser 120 charges said voltage drop will increase and at a predetermined time or after an interval determined by the factors of the time control circuit, said voltage drop will be sufficient to energize relay coil U. Thus, active energization of coil U is a relative term and hereinafter said relay coil U will be considered energized only when a voltage drop, equal to or greater than its critical voltage, is impressed thereon and will be considered de-energized when a voltage drop less than its critical voltage is thereacross. The charging rate of the condenser is selected or adjusted so that the interval for the voltage drop across relay coil U to reach its critical voltage is equal to the time required for the leading edge of a document to move from engagement with control members or fingers 65 to the leading edge of aperture 29. Upon energization of relay coil U, switches $U_1$, $U_2$, and $U_3$ are actuated to their closed position. When switch $U_1$ is closed, the shunt circuit across resistance 127 is completed and condenser 120 is then placed directly across lines 104 and 105 and is fully charged always at the same voltage. Closing of switch $U_2$ completes the circuit through lead 134 to energize relay coil X which actuates switch $X_1$ to its closed position thereby short-circuiting switch 74. When $U_3$ is closed, the circuit through lead 136 is completed to energize the electromagnetic clutch 21, thereby causing the film strip to be moved through exposure station 13 in synchronism with the movement of the document past aperture 29.

When the trailing edge of the document disengages the trip fingers 65, switch arm 123 is moved into engagement with terminal 122. As a result, a discharging circuit for condenser 120 is established and such circuit extends from one side of condenser 120 and through lead 125, arm 123, terminal 122, lead 133, resistance 131, lead 132 and lead 126 to the other side of condenser 120. The discharging rate of condenser 120 is adjusted so that the interval for the voltage drop across relay coil U to reduce for effective de-energization thereof is equal to the time required for the trailing edge of a document to move after disengagement of fingers 65 to and past aperture 29. For uniformity of this trailing interval, condenser 120 should start its discharge cycle always at the same voltage and this is obtained by insuring that condenser 120 is charged always to the same voltage and by the expedient of shunting the charging resistance 127 by means of relay switch $U_1$ and leads 129 and 130. Upon de-energization of relay coil U, relay switch $U_1$ is opened to re-introduce resistance 127 for the charging cycle, relay switch $U_2$ is opened to break the lamp circuit through relay switch $X_1$ and relay switch $U_3$ is opened to interrupt the clutch circuit and, hence, movement of the film strip. The tandem relation of relays U and X introduces sufficient lag in interruption of the illuminating circuit so that the clutch 21 has had an opportunity to be disengaged and the film drive is stopped simultaneously with interruption of the illuminating circuits.

If it is assumed that the document being photographed is of such length that aperture 33 must be used to photograph the reverse side of the document, the double-pole switches 141 and 141' remain in the position as shown in Fig. 9. Illumination of lamp bank 64 and energization of clutch 21 is accomplished through the charge and discharge of condenser 120' in the same manner as described with respect to condenser 120. Since the distance between aperture 32 and 29 is greater than the length of the document, the clutch 21 will not be energized before the document reaches aperture 32 even though the document may be of such length that the leading edge will trip fingers 67 while the trailing edge has not yet been moved through aperture 29. In this case, the lamp bank 64 will be energized at the same time as bank 63 but will have no effect on the photographing of the obverse side of the document. When condenser 120' reaches its fully-charged condition, relay coil V will close relay switches $V_1$, $V_2$, and $V_3$ to maintain the shunt circuit through resistance 127', to close the circuit through relay Y which moves switch $Y_1$ to its position for maintaining lamp bank 64 energized and to close the circuit through clutch 21 for advancement of the film strip. When the trailing edge of the document leaves fingers 67, the discharge of condenser 120' through resistance 131' maintains relay V energized until the trailing edge of the document has been moved past aperture 32. The relay V is then de-energized, and switches $V_1$, $V_2$, and $V_3$ are opened to break their respective circuits.

If a document is longer than the distance between apertures 29 and 32 and is inadvertently fed into the machine, the switch $Y_1$, when actuated, will break the circuit through lead 112 so that lamp bank 63 will be de-energized even though a portion of the document is still to be moved past aperture 29. This arrangement prevents double exposure, even though all the document has not been photographed. Upon closure of either switch $U_3$ or $V_3$, the relay coil 109 is energized to move fingers 95 into their blocking position across feeding station 15. To permit photographing only the obverse side or only the reverse side of a document, switch 135 is placed in lead 108, switch 137 is placed in lead 115, switch 135' is placed in lead 124 and switch 137' is placed in lead 144. These switches, together with switches 141, 141', and 141'', are of the gang type, that is, a single member actuates both 135 and 135', 137 and 137', and 141, 141', and 141''. Switches 135 and 135' are actuated by the operator when it is desired to photograph only the reverse side of the document and serve to cut out lamp bank 63 and the control circuit for condenser 120, thereby preventing actuation of clutch 21 by relay U. In the same manner, switches 137 and 137' serve to cut out lamp bank 64 and the control circuit for condenser 120', thereby preventing actuation of clutch 21 by relay V when it is desired to photograph only the obverse side of the document. Switches 141, 141' and 141'' are utilized when the document is of such size that aperture 31 is used in place of aperture 32 and serve, respectively, to connect switch 75 across leads 118 and 119 via terminal 140 and arm 142, to connect leads 144 and 124' via terminal 140' and arm 142', thereby rendering ineffective actuation of fingers 67 by the document, and to connect lead 149 to lead 125' via terminal 140'' and arm 142''. Condenser 120', therefore, will be connected across lines 104 and 105 by line 144, line 145, line 147, line 125', line 126', resistance 127' and line 128' when utilizing aperture 32 and by line 144, line 124', line 149, line 125', line 126', resistance 127' and line 128' when utilizing aperture 31.

From the foregoing description, together with the more detailed description of the control system contained in the above-mentioned Egan patent, it is evident that the spacing between successive document images is maintained within very small limits because the charging and discharging rates of a condenser have fixed and uniform characteristics. The fingers 65, 66, and 67, therefore, provide a control member which is responsive to document movement, and the condensers 120 and 120' provide a control means for insuring a uniform predetermined spacing between successive documents.

Since many variations of the illustrated embodiment of my invention are possible and will be readily recognized by those skilled in the art, the present disclosure is only illustrative and the scope of the invention is defined by the appended claims.

Having now particularly described my invention, what I desire to secure by Letters Patent of the United States and what I claim is:

1. In an apparatus for successively photographing each side of a document and having an exposure station, the combination comprising a guideway for said document and provided with an aperture for viewing the obverse side of said document, a second guideway for said document and provided with an aperture for viewing the reverse side of said document, said second guideway being a continuation of said first-mentioned guideway and said apertures being spaced apart in the direction of document movement by a distance greater than the length of said document, an advancing means for moving said document through said guideway and for moving a light-sensitive material through said exposure station in synchronism with the movement of said document, and means for successively projecting the images of the obverse and reverse sides of said document onto said sensitized material in spaced relation lengthwise thereof.

2. In an apparatus for successively photographing each side of a document and having an exposure station, the combination comprising a guideway for said document and provided with an aperture for successively viewing transverse areas of the obverse side of said document, a second guideway for said document and provided with an aperture for successively viewing transverse areas of the reverse side of said document, said second guideway being a continuation of said first-mentioned guideway and said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, and means for successively projecting the images of the obverse and reverse sides of said document onto said sensitized material in spaced relation lengthwise thereof.

3. In an apparatus for successively photographing each side of a document and having an exposure station, the combination comprising a guideway for said document and provided with an aperture for successively viewing transverse areas of the obverse side of said document, a second guideway for said document and provided with an aperture for successively viewing transverse areas of the reverse side of said document, said second guideway being a continuation of said first-mentioned guideway and said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, and reflecting means angularly disposed with respect to each of said apertures for successively directing the images of the obverse and reverse sides of said document into said exposure station and in spaced relation lengthwise of said light-sensitive material.

4. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, and means including a projection lens system for receiving the image of the obverse side of said document and a second projection lens system for receiving the image of the reverse side of said document, said lens systems projecting said images successively onto said sensitized material in spaced relation lengthwise thereof.

5. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, and means including a projection lens system for receiving the image of the obverse side of said document and a second projection lens system for receiving the image of the reverse side of said document, said lens systems projecting said images successively onto said sensitized material in spaced relation lengthwise thereof, and reflecting means angularly disposed with respect to each of said apertures for successively directing the images of the obverse and reverse sides of said document into its respective projection lens system.

6. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, and means including a projection lens system for receiving the image of the obverse side of said document and a second projection lens system for receiving the image of the reverse side of said document, said lens systems having their optical axes substantially parallel and displaced in horizontal and vertical planes for projecting said images successively onto said sensitized material in spaced relation lengthwise thereof.

7. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, means including a projection lens system for receiving the image of the obverse side of said document and a second projection lens system for receiving the image of the reverse side of said document, said lens systems having their optical axes substantially parallel and displaced in horizontal and vertical planes for projecting said images successively onto said sensitized material in spaced relation lengthwise thereof, and reflecting means angularly disposed with respect to each of said apertures for successively directing the images of the obverse and reverse sides of said document into its respective projection lens system.

8. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, means including a projection lens system for receiving the image of the obverse side of said document and a second projection lens system for receiving the image of the reverse side of said document, said lens systems having their optical axes substantially parallel in a horizontal plane centrally of said apertures for projecting said images successively onto said sensitized material in spaced relation lengthwise thereof, and a reflecting system angularly disposed with respect to each of said apertures for successively directing the image of the obverse and reverse sides of said document into its respective projection lens system.

9. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, an advancing means for moving said document through said guideway and for moving a light-sensitive material through said exposure station in synchronism with the movement of said document, means including a projection lens system for receiving the image of the obverse side of said document and a second projection lens system for receiving the image of the reverse side of said document, said lens systems having their optical axes substantially parallel in a horizontal plane centrally of said apertures for projecting said images successively onto said sensitized material in spaced relation lengthwise thereof, reflecting means angularly disposed with respect to each of said apertures for directing the images of the obverse and reverse sides of said document into the horizontal plane of said lens systems, and a second reflecting means angularly disposed with respect to said guideway and on each side thereof for receiving and directing the images of said first-mentioned reflecting means into its respective projection lens system.

10. In an apparatus for successively photographing each side of a document and having an exposure station, the combination comprising a guideway for said document and provided with an aperture for successively viewing transverse areas of the obverse side of said document and with a plurality of apertures for successively viewing transverse areas of the reverse side of said document, said last-mentioned apertures being spaced apart and spaced from said first-mentioned aperture in the direction of document movement, means for illuminating the portion of said document opposite said apertures, an advancing means for moving said document through said guideway and for moving a light-sensitive material through said exposure station in synchronism with the movement of said document, reflecting means adjacent said first-mentioned aperture for directing the image of the obverse side of said document into said exposure station, and a second reflecting means adapted to be positioned adjacent one of said last-mentioned apertures which is spaced from said first-mentioned aperture by a distance greater than the length of said document, said reflecting means being angularly disposed with respect to said apertures for successively directing the images of the obverse and reverse sides of said document into said exposure station and in spaced relation lengthwise of said light-sensitive material.

11. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, a feeding means for moving said document through said guideway, an advancing means adapted to operate in synchronism with said feeding means and for moving a light-sensitive material through said exposure aperture, control members ahead of each of said apertures in the document path and responsive to a document moving through said guideway, a control means responsive to movement of each of said control members for controlling said advancing means to provide a predetermined spacing between successive document images on said light-sensitive material, a masking means in said exposure station adjacent said light-sensitive material and provided with an aperture extending transversely of said light-sensitive material and arranged about an axis centrally of said spaced apertures, means including a projection lens system for receiving the image of the obverse side of said document and a second projection lens system for receiving the image of the reverse side of said document, said lens systems having their optical axes substantially parallel to said masking axis and displaced in horizontal and vertical planes therefrom for projecting said images successively through said masking aperture onto said sensitized material in spaced relation lengthwise thereof and for varying said predetermined spacing between successive document images, and reflecting means angularly disposed with respect to each of said apertures for successively directing the images of the obverse and reverse sides of said document into its respective projection lens system.

12. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, a feeding means for moving said document through said guideway, an advancing means adapted to operate in synchronism with said feeding means and for moving a light-sensitive material through said exposure aperture, control members ahead of each of said apertures in the document path and responsive to a document moving through said guideway, a control means responsive to movement of each of said control members for controlling said advancing means to provide a predetermined spacing between successive document images on said light-sensitive material, a masking means in said exposure station adjacent said light-sensitive material and provided with an aperture extending transversely of said light-sensitive material and arranged about an axis centrally of said spaced apertures, means including a projection lens system for receiving the image of the obverse side of said document and a second projection lens system for receiving the image of the reverse side of said document, said lens systems having their optical axes substantially parallel to said masking axis and displaced in horizontal and vertical planes therefrom for projecting said images successively through said masking aperture onto said sensitized material in spaced relation lengthwise thereof and for increasing the predetermined spacing between the reveres image of one document and the obverse image of the succeeding document and decreasing the predetermined spacing between the obverse and reverse images of the same document, and reflecting means angularly disposed with respect to each of said apertures for successively directing the images of the obverse and reverse sides of said document into its respective projection lens system.

13. In an apparatus for successively photographing each side of a document and having an exposure station and a feeding station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, means for illuminating the portion of said document opposite said apertures, a feeding means for moving said document through said guideway, an advancing means adapted to operate in synchronism with said feeding means and for moving a light-sensitive material through said exposure station, control members ahead of each of said apertures in the document path and responsive to a document moving through said guideway, control means responsive to movement of said control members for controlling said advancing means and providing one time interval between movement of said control members by the leading edge of a document and operation of said advancing means and a second time interval between movement of said control members by passage of a trailing edge of a document and inoperativeness of said advancing means whereby a predetermined spacing is maintained between successive document images on said light-sensitive material, a masking means in said exposure station adjacent said light-sensitive material and provided with an aperture extending transversely of said light-sensitive material and arranged about an axis centrally of said spaced apertures, means including a projection lens system for receiving the image of the obverse side of said document and a second projection lens system for receiving the image of the reverse side of said document, said lens systems having their optical axes substantially parallel to said masking axis and displaced in horizontal and vertical planes therefrom for projecting said images successively through said masking aperture onto said sensitized material in spaced relation lengthwise theerof and for increasing the predetermined spacing between the reverse image of one document and the obverse image of the next document and decreasing the predetermined spacing between the obverse and reverse images of the same document, and reflecting means angularly disposed with respect to each of said apertures for successively directing the images of the obverse and reverse sides of said document into its respective projection lens system.

14. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, an illuminating circuit including an incandescent light source for illuminating each of said apertures, reflecting means angularly disposed with respect to each of said apertures for successively directing the images of the obverse and reverse sides of said document into said exposure station, feeding means for moving said document through said guideway, an advancing means adapted to operate in synchronism with said feeding means for moving a light-sensitive material through said exposure station, control means including a member ahead of said first-mentioned aperture and a second member ahead of said second aperture, said members being spaced apart by a distance greater than the length of said document and responsive to a document moving through said guideway, and a second control means responsive to movement of said members for initiating and maintaining said illuminating means and said advancing means operative upon movement of said document past each of said apertures.

15. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, an illuminating circuit including an incandescent light source for illuminating each of said apertures, reflecting means angularly disposed with respect to each of said apertures for successively directing the images of the obverse and reverse sides of said document into said exposure station, feeding means for moving said document through said guideway, an advancing means adapted to operate in synchronism with said feeding means for moving a light-sensitive material through said exposure station, control means including a member ahead of said first-mentioned aperture and a second member ahead of said second aperture, said members being spaced apart by a distance greater than the length of said document and responsive to a document moving through said guideway, a second control means responsive to movement of said members for initiating and maintaining said illuminating means and said advancing means operative upon movement of said document past each of said apertures, and means for selectively rendering said illuminating means and second control means inoperative to permit photographing only one side of said document.

16. In an apparatus for successively photographing each side of a document and having an exposure station, the combination comprising a guideway for said document and provided with an aperture for successively viewing transverse areas of the obverse side of said document and with a second aperture for successively viewing transverse areas of the reverse side of said document, said apertures being spaced apart in the direction of document movement by a distance greater than the length of said document, an illuminating circuit including an incandescent light source for illuminating each of said apertures, reflecting means angularly disposed with respect to each of said apertures for successively directing the images of the obverse and reverse sides of said document into said exposure station, feeding means for moving said document through said guideway, an advancing means adapted to operate in synchronism with said feeding means for moving a light-sensitive material through said exposure station, control means including a member ahead of said first-mentioned aperture and a second member ahead of said second aperture, said members being spaced apart by a distance greater than the length of said document and responsive to a document moving through said guideway, a second control means responsive to movement of said members for initiating and maintaining said illuminating means and said advancing means operative upon movement of said document past each of said apertures, and means responsive to said second control means for preventing insertion of another document into said feeding station until said document has been moved past said second aperture.

ALVIN E. SCHUBERT.

No references cited.